United States Patent
Doihara et al.

(10) Patent No.: US 8,843,287 B2
(45) Date of Patent: Sep. 23, 2014

(54) BELT-BASED, CONTINUOUSLY-VARIABLE TRANSMISSION CONTROL DEVICE AND CONTROL METHOD

(75) Inventors: Katsumi Doihara, Fuji (JP); Yoshihisa Kodama, Fuji (JP); Yasuaki Yoshikawa, Fuji (JP); Masahiro Nishi, Fuji (JP); Keisuke Koyama, Fuji (JP); Kenta Nakamura, Fuji (JP); Kiyotaka Sawano, Fuji (JP); Hidemasa Kawaguchi, Fuji (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 459 days.

(21) Appl. No.: 13/266,830

(22) PCT Filed: Apr. 30, 2009

(86) PCT No.: PCT/JP2009/058461
§ 371 (c)(1),
(2), (4) Date: Jan. 9, 2012

(87) PCT Pub. No.: WO2010/125668
PCT Pub. Date: Nov. 4, 2010

(65) Prior Publication Data
US 2012/0108374 A1    May 3, 2012

(51) Int. Cl.
*G06F 7/00* (2006.01)
*F16H 61/662* (2006.01)
*F16H 59/70* (2006.01)

(52) U.S. Cl.
CPC .......... *F16H 61/66272* (2013.01); *F16H 59/70* (2013.01)
USPC ................. 701/60; 477/45; 477/46

(58) Field of Classification Search
CPC ..... F16H 61/12; F16H 61/6672; F16H 59/70; F16H 2061/1208; F16H 2061/124; F16H 2061/1264
See application file for complete search history.

(56) References Cited

U.S. PATENT DOCUMENTS

| 4,649,486 A | 3/1987 | Oshiage |
| 4,735,597 A | 4/1988 | Cadee |

(Continued)

FOREIGN PATENT DOCUMENTS

| CN | 1657803 A | 8/2005 |
| EP | 1236935 A2 | 9/2002 |

(Continued)

OTHER PUBLICATIONS

Russian Office Action and English Translation, dated Mar. 5, 2013, 15 pages.

(Continued)

*Primary Examiner* — David D Le
(74) *Attorney, Agent, or Firm* — Foley & Lardner LLP

(57) ABSTRACT

A belt type continuously variable transmission mechanism has a primary pulley, a secondary pulley, and a belt, and a secondary hydraulic pressure controller to determine command secondary hydraulic pressure by feedback control based on the deviation between target secondary hydraulic pressure and actual hydraulic pressure, and control the secondary hydraulic pressure to the secondary pulley. The belt type continuously variable transmission mechanism further includes a belt slip control device to estimate a belt slip condition by monitoring the phase difference between an oscillation component included in the actual secondary hydraulic pressure and an oscillation component included in the actual transmission gear ratio and control the actual secondary hydraulic pressure to decrease based on the estimation so that a predetermined belt slip condition is maintained. The secondary hydraulic pressure control unit aborts feedback control of the secondary hydraulic pressure during belt slip control and controls the secondary hydraulic pressure by open control.

3 Claims, 10 Drawing Sheets

(56) References Cited

U.S. PATENT DOCUMENTS

| | | | |
|---|---|---|---|
| 5,766,105 | A | 6/1998 | Fellows et al. |
| 7,179,196 | B2 | 2/2007 | Oshita et al. |
| 7,189,184 | B2 | 3/2007 | Oshiumi et al. |
| 7,774,120 | B2 | 8/2010 | Yamaguchi et al. |
| 7,819,764 | B2 | 10/2010 | Kimura et al. |
| 7,892,141 | B2 | 2/2011 | Yamaguchi et al. |
| 8,133,140 | B2 | 3/2012 | Yamaguchi et al. |
| 8,600,634 | B2 * | 12/2013 | Van Der Sluid et al. ........ 701/61 |
| 2002/0155910 | A1 | 10/2002 | Nishizawa et al. |
| 2004/0242355 | A1 * | 12/2004 | Yamaguchi et al. ............ 474/18 |
| 2005/0181909 | A1 | 8/2005 | Oshiumi et al. |
| 2007/0197320 | A1 | 8/2007 | Kimura et al. |
| 2007/0232424 | A1 | 10/2007 | Nishida |
| 2008/0146409 | A1 | 6/2008 | Yamaguchi et al. |
| 2012/0252612 | A1 | 10/2012 | Kodama et al. |
| 2012/0258825 | A1 | 10/2012 | Kodama et al. |

FOREIGN PATENT DOCUMENTS

| | | |
|---|---|---|
| EP | 1 329 650 A2 | 7/2003 |
| EP | 1 698 805 A2 | 9/2006 |
| JP | 04-013575 B2 | 3/1992 |
| JP | 4-13578 B2 | 3/1992 |
| JP | 04-013757 B2 | 3/1992 |
| JP | 2003-65428 A | 3/2003 |
| JP | 2003-202075 A | 7/2003 |
| JP | 2003-236509 A | 8/2003 |
| JP | 2007-211855 A | 8/2004 |
| JP | 2004-293652 A | 10/2004 |
| JP | 2004-316860 A | 11/2004 |
| JP | 2004-358999 A | 12/2004 |
| JP | 2005-030511 A | 2/2005 |
| JP | 2008-151198 A | 7/2005 |
| RU | 2 012 833 C1 | 5/1994 |
| RU | 2 133 895 C1 | 7/1999 |
| SU | 1454242 A3 | 1/1989 |
| SU | 1682691 | 10/1991 |
| WO | WO 2009/007450 A2 | 1/2009 |

OTHER PUBLICATIONS

U.S. Appl. No. 13/266,804, filed Oct. 28, 2011, Doihara et al.
U.S. Appl. No. 13/266,808, filed Oct. 28, 2011, Doihara et al.
U.S. Appl. No. 13/266,816, filed Oct. 28, 2011, Doihara et al.
U.S. Appl. No. 13/266,823, filed Oct. 28, 2011, Doihara et al.
K. Doihara, U.S. PTO Official Action, U.S. Appl. No. 13/266,823, dated May 2, 2014, 17 pages.
K. Doihara, U.S. PTO Official Action, U.S. Appl. No. 13/266,804, dated May 9, 2014, 14 pages.
K. Doihara, U.S. PTO Official Action, U.S. Appl. No. 13/266,816, dated May 29, 2014, 20 pages.

* cited by examiner

BELT-BASED, CONTINUOUSLY-VARIABLE TRANSMISSION CONTROL DEVICE AND CONTROL METHOD

TECHNICAL FIELD

The present invention relates to a device and a method for controlling a belt type continuously variable transmission to perform a belt slip control in which a belt wrapped around pulleys is slipped at a predetermined slip rate.

BACKGROUND ART

A known belt type continuously variable transmission controller is configured to perform a belt slip control in which an actual secondary hydraulic pressure is reduced from one during a normal control to slip a belt wrapped around pulleys at a predetermined slip rate by controlling the actual secondary hydraulic pressure on the basis of a multiplier of an oscillation component included in the actual secondary hydraulic pressure and an oscillation component included in an actual gear ratio. This eliminates the necessity for directly detecting the belt slip rate and thereby facilitates the belt slip control. Also, it is known that the estimated accuracy of a belt slip condition is improved by superimposing a predetermined sine wave on a command secondary hydraulic pressure or oscillating the command secondary hydraulic pressure to purposefully oscillate the actual secondary hydraulic pressure and the actual gear ratio (see Patent Document 1, for example).

PRIOR ART DOCUMENT

Patent Document

Patent Document 1: WO 2009/007450 A2 (PCT/EP2008/059092)

SUMMARY OF THE INVENTION

Problems to be Solved by the Invention

However, the known belt type continuously variable transmission controller does not deal with how to control the secondary hydraulic pressure during belt slip control, which may causes the following problem.

In normal control the secondary hydraulic pressure to a secondary pulley of a belt type continuously variable transmission is controlled to be a command secondary hydraulic pressure which is determined by feedback control based on a deviation between a target secondary hydraulic pressure for acquiring a necessary belt clamp force and an actual secondary hydraulic pressure determined by a sensor signal. Meanwhile, in belt slip control it is controlled on the basis of a belt slip condition estimated using an oscillation component included in the actual secondary hydraulic pressure. With the feedback control over the secondary hydraulic pressure maintained during the belt slip control and the secondary hydraulic pressure not responding to the command secondary hydraulic pressure, the deviation used to obtain a feedback control amount increases or a phase difference between the actual secondary hydraulic pressure and the command secondary hydraulic pressure increases. This impairs the stability of control over the secondary hydraulic pressure, which may lead to diverging the secondary hydraulic pressure control.

In view of solving the above problem, the present invention aims to provide control device and method for a belt type continuously variable transmission which can improve the stability of control over the secondary hydraulic pressure during belt slip control with the estimated accuracy of a belt slip condition ensured.

Means to Solve the Problem

To attain the above object, a control device for a belt type continuously variable transmission according to the present invention comprises a primary pulley for receiving an input from a drive source, a secondary pulley for providing an output to a drive wheel, a belt wrapped around the primary pulley and the secondary pulley, to control a belt clamp force on the basis of a command secondary hydraulic pressure to the secondary pulley, The control device further includes a switch means between a normal control and a belt slip control means for a secondary hydraulic pressure. The switch means between the belt slip control and the normal control is configured to determine, on the basis of a belt slip control permitting condition, whether or not to permit the belt slip control in which the secondary hydraulic pressure is reduced from that in the control and to switch the between the belt slip control and the normal control. In the normal control, the control means is configured to set the command secondary hydraulic pressure by feedback control based on a deviation between a target secondary hydraulic pressure and an actual secondary hydraulic pressure to control the secondary hydraulic pressure to the secondary pulley. In the belt slip control, it is configured to inhibit the feedback control based on the deviation, and, in replace of the feedback control, control the secondary hydraulic pressure to the secondary pulley by oscillating the secondary hydraulic pressure and monitoring a phase difference between an oscillation component included in an actual hydraulic pressure and an oscillation component inluded in am actual gear ratio to estimate a belt slip condition, and setting the command secondary hydraulic pressure on the basis of the estimation so that a predetermined belt slip condition is maintained.

Effects of the Invention

Thus, the control device for the belt type continuously variable transmission in the present invention determines, on the basis of the belt slip control permitting condition, wheather or not to permit the belt slip control in which the secondary hydraulic pressure is reduced from that in the normal control and switches between the belt slip control and the normal control In the normal control, it sets the command hydraulic pressure by the feedback control based on the devation between the target hydraulic pressure and the actual hydraulic preesure. In the belt slip control, it inhibits the feedback control based on the deviation, and, in replace of the feedback control, oscillates the hydraulic pressure and sets a value of the command hydraulic pressure on the basis of a multiplied value (phase difference) of the oscillation component included in the actual hydraulic pressure and that included in the actual gear ratio to be lower than that by the feedback the control. This makes it possible to stably control the actual secondary hydraulic pressure by inhibiting the feedback control based on the deviation in the hydraulic pressure, even if it is extremely oscillated on purpose, improving the estimated accuracy of the belt slip condition estimated by monitoring the phase difference between the oscillation component included in the actual secondary hydraulic pressure and the oscillation component included in the actual gear ratio. Further, the control is prevented from becoming unstable during the belt slip control, which occurs under the maintained feedback control using the actual secondary hydraulic pressure information. As a result, the stability of control over the secondary hydraulic pressure can be improved during the belt slip control with the estimated accuracy of a belt slip condition ensured.

EMBODIMENTS OF DESCRIPTION

Figure 1:
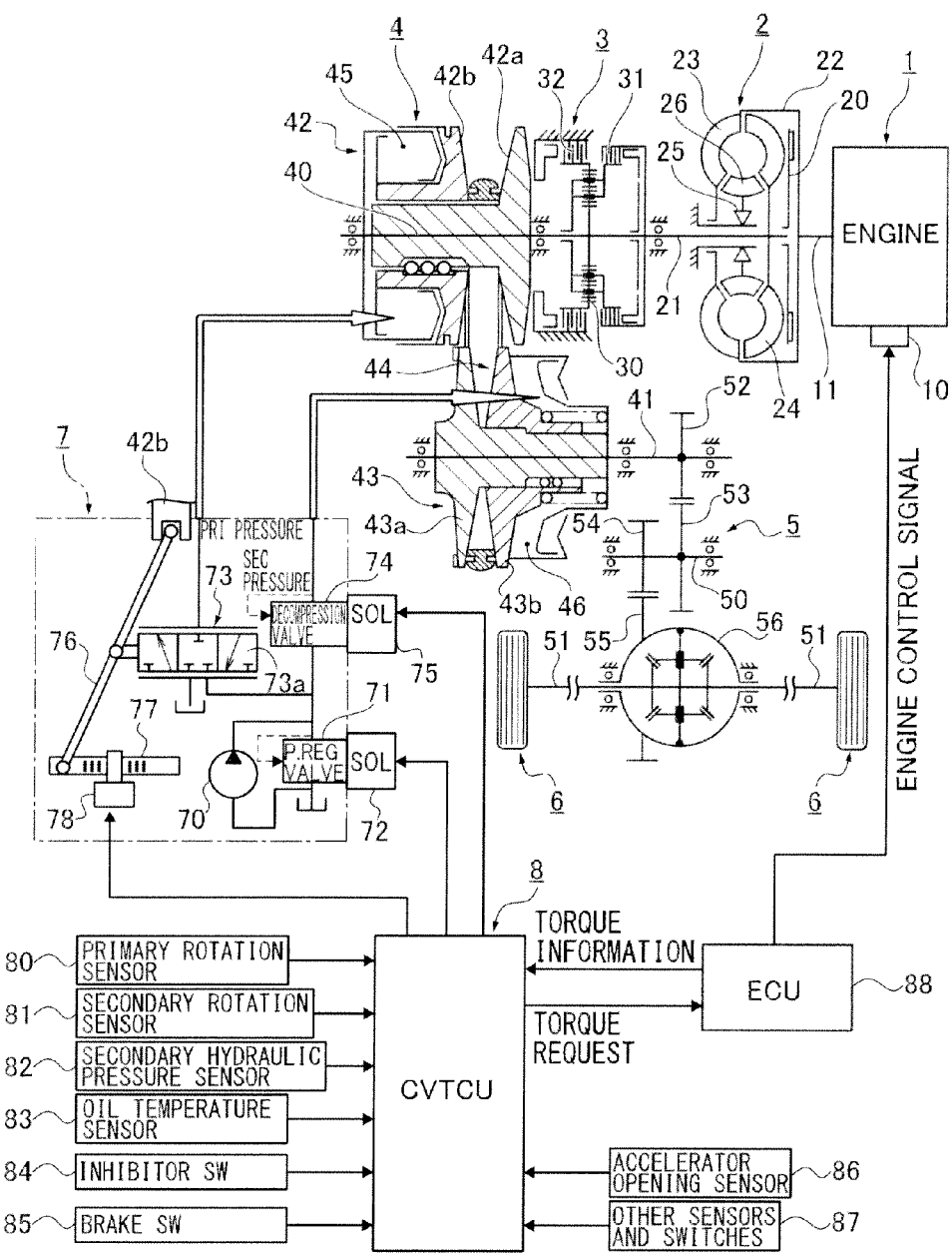
FIG. 1 shows the entire system of a drive system and a control system of a vehicle incorporating a belt type continuously variable transmission applied with a control device and method according to a first embodiment.
Figure 2:
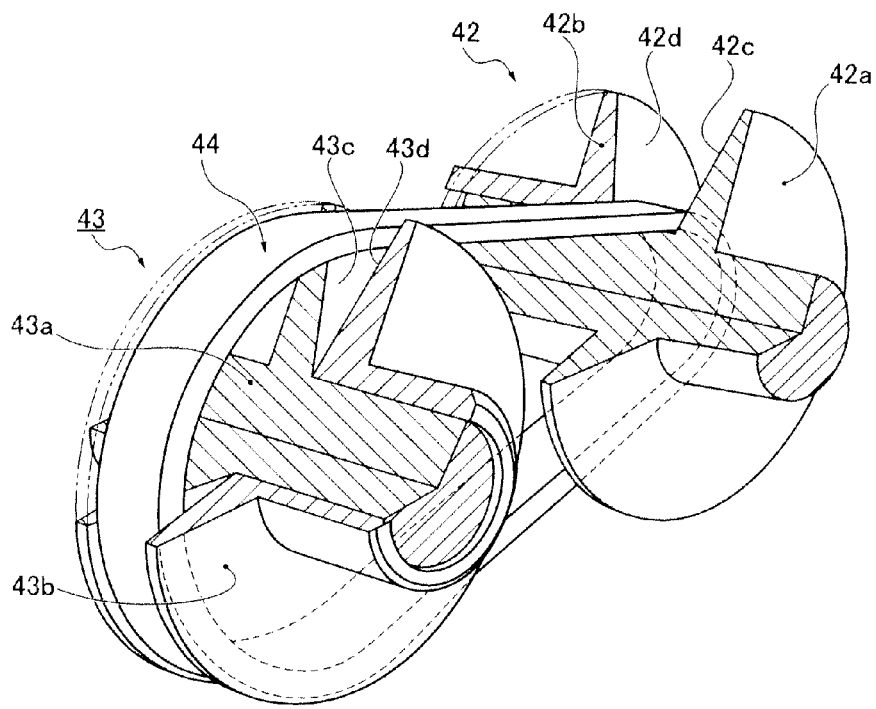
FIG. 2 is a perspective view of the belt type continuously variable transmission mechanism applied with the control device and method according to the first embodiment.
Figure 3:
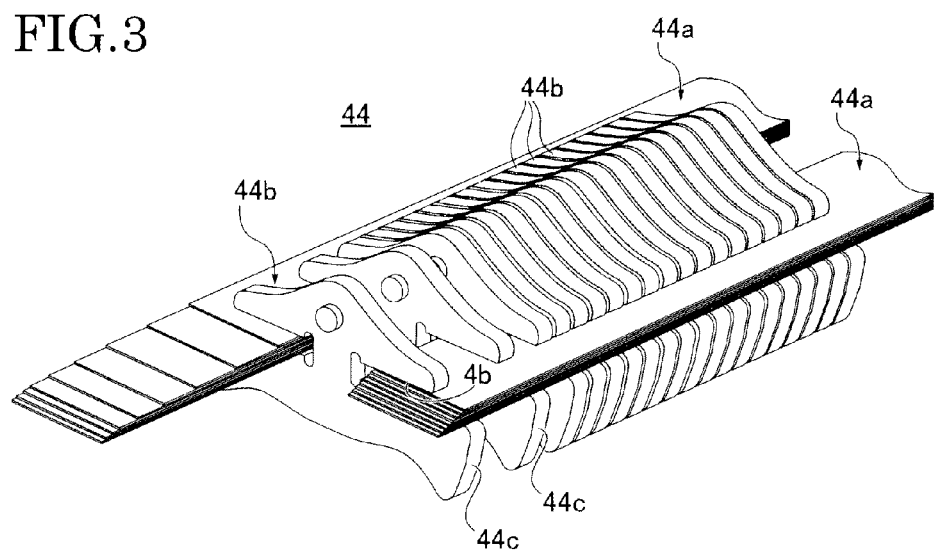
FIG. 3 is a perspective view of a part of a belt of the belt type continuously variable transmission mechanism applied with the control device and method according to the first embodiment.

Hereinafter, the best mode to carry out the control device and method for a belt type continuously variable transmission will be described using a first embodiment with reference to the accompanying drawings.
First Embodiment First, the structure of the device is described. FIG. 1 shows the entire system of a drive system and a control system of a vehicle incorporating a belt type continuously variable transmission applied with a control device and method according to the first embodiment. FIG. 2 is a perspective view of the belt type continuously variable transmission mechanism applied with the control device and method according to the first embodiment. FIG. 3 is a perspective view of a part of a belt of a belt type continuously variable transmission mechanism applied with the control device and method according to the first embodiment. In the following the system structures arc described with reference to FIGS. 1 to 3.

In FIG. 1 the drive system of a vehicle incorporating a belt type continuously variable transmission comprises an engine 1, a torque converter 2, a forward/backward drive switch mechanism 3, a belt type continuously variable transmission mechanism 4, a final reduction mechanism 5 and drive wheels 6, 6.

The output torque of the engine 1 is controllable by an engine control signal supplied from the exterior in addition to by a driver's acceleration operation. The engine 1 includes an output torque control actuator 10 to control the output torque by a throttle valve opening/closing operation, a fuel cut operation and else.

The torque converter 2 is a startup element with a torque increasing function and includes a lockup clutch 20 to be able to directly connect an engine output shaft 11 (=torque converter input shaft) and a torque converter output shaft 21. The torque converter 2 is comprised of a turbine runner 23 connected with the engine output shaft 11 via a converter housing 22, an impeller pump 24 connected with the torque converter output shaft 21, and a stator 26 provided via a one-way clutch 25.

The forward/backward drive switch mechanism 3 is to switch a rotary direction input to the belt type continuously variable transmission mechanism 4 between a normal rotary direction during forward traveling and a reverse rotary direction during backward traveling. The forward/backward switch mechanism 3 includes a double pinion planetary gear 30, a forward clutch 31, and a backward brake 32. A sun gear of the double pinion planetary gear 30 is connected with the torque converter output shaft 21 and a carrier thereof is connected With a transmission input shaft 40. The forward clutch 31 is fastened during a backward traveling to fix a ring gear of the double pinion planetary gear 30 to the case.

The belt type continuously variable transmission mechanism 4 has a continuously variable transmission function to steplessly vary the gear ratio by changing a belt contact radius. The gear ratio is a ratio of the input rotation rate of the transmission input shaft 40 and the output rotation rate of the transmission output shaft 41. The belt type continuously variable transmission mechanism 4 includes a primary pulley 42, a secondary pulley 43, and a belt 44. The primary pulley 42 is made up of a fixed pulley 42a and a slide pulley 42b. The slide pulley 42b is slid by primary hydraulic pressure introduced into a primary hydraulic pressure chamber 45. The secondary pulley 43 is made up of a fixed pulley 43a and a slide pulley 43b. The slide pulley 43b is slid by primary hydraulic pressure introduced into a secondary hydraulic pressure chamber 46. The belt 44 as shown in FIG. 2 is wrapped around V-form sheave faces 42c, 42d of the primary pulley 42 and V-form sheave faces 43c, 43d of the secondary pulley 43. In FIG. 3 the belt 44 is formed of two laminated rings 44a, 44a of which a large number of rings are layered from inside to outside as well as a large number of elements 44b of press-cut plates placed between the two laminated rings 44a, 44a and connected with each other in a ring-form. The elements 44b each includes, at both sides, flank faces 44c, 44c to contact with the sheave faces 42c, 42d of the primary pulley 42 and the sheave faces 43c, 43d of the secondary pulley 43.

The final reduction mechanism 5 decelerates the transmission output rotation from the transmission output shaft 41 of the belt type continuously variable transmission mechanism 4 and provides a different function thereto to transmit it to the right and left drive wheels 6, 6. The final reduction mechanism 5 is interposed among the transmission output shaft 41, an idler shaft 50, right and left drive shafts 51, 51, and includes a first gear 52, a second gear 53, a third gear 54, and a fourth gear 55 with a deceleration function and a gear differential gear 56 with a differential function.

The control system of the belt type continuously variable transmission comprises a transmission hydraulic pressure control unit 7 and a CVT control unit 8, as shown in FIG. 1.

The transmission hydraulic pressure control unit 7 is a hydraulic pressure control unit to produce primary hydraulic pressure introduced into the primary hydraulic pressure chamber 45 and secondary hydraulic pressure introduced into the secondary hydraulic pressure chamber 46. The transmission hydraulic pressure control unit 7 comprises an oil pump 70, a regulator valve 71, a line pressure solenoid 72, a transmission control valve 73, a decompression valve 74, a secondary hydraulic pressure solenoid 75, a servo link 76, a transmission command valve 77, and a step motor 78.

The regulator valve 71 uses discharged pressure from the oil pump 70 as a pressure source to adjust line pressure PL. The regulator valve 71 includes the line pressure solenoid 72 to adjust the pressure of oil from the oil pump 70 to a predetermined line pressure PL in response to a command from the CVT control unit 8.

The transmission control valve 73 uses the line pressure PL produced by the regulator valve 71 as a pressure source to adjust the primary hydraulic pressure introduced into the primary hydraulic pressure chamber 45. A spool 73a of the transmission control valve 73 is connected with the servo link 76 constituting a mechanical feedback mechanism and the transmission command valve 77 connected with one end of the servo link 76 is driven by the step motor 78 so that the transmission control valve receives feedback of a slide position (actual pulley ratio) from slide pulley 42b of the primary pulley 42 connected with the other end of the servo link 76. That is, during transmission, when the step motor 78 is driven in response to a command from the CVT control unit 8, the spool 73a of the transmission control valve 73 is changed in position to supply discharge the line pressure PL to from the primary hydraulic pressure chamber 45 to adjust the primary hydraulic pressure to acquire a target gear ratio commanded at the drive position of the step motor 78. Upon completion of the transmission, the spool 73a is held at a closed position in response to a displacement of the servo link 76.

The decompression valve 74 uses the line pressure PL produced by the regulator valve 71 as a pressure source to adjust the secondary hydraulic pressure introduced into the secondary hydraulic pressure chamber 46 by decompression. The decompression valve 74 comprises the secondary hydraulic pressure solenoid 75 to decompress the line pressure PL to a command secondary hydraulic pressure in accordance with a command from the CVT control unit 8.

The CVT control unit 8 is configured to perform various control such as a gear ratio control to output to the step motor 78 a control command to acquire a target gear ratio in accordance with vehicle speed, throttle opening level and else, a line pressure control to output to the line pressure solenoid 72 a control command to acquire a target line pressure in accordance with the throttle opening level or else, a secondary hydraulic pressure control to output to the secondary hydraulic pressure solenoid 75 a control command to acquire a target secondary pulley thrust in accordance with transmission input torque or else, a forward and backward switch control to control the fastening and release of the forward clutch 31 and backward brake 32, and a lockup control to control fastening and release of the lockup clutch 20. The CVT control unit 8 receives various sensor information and switch information from a primary rotation sensor 80, a secondary rotation sensor 81, a secondary hydraulic pressure sensor 82, an oil temperature sensor 83, an inhibitor switch 84, a brake switch 85, an accelerator opening sensor 86, and other sensors and switches 87. Further, it receives torque information from an engine control unit 88 and outputs a torque request to the engine control unit 88.

Figure 4:
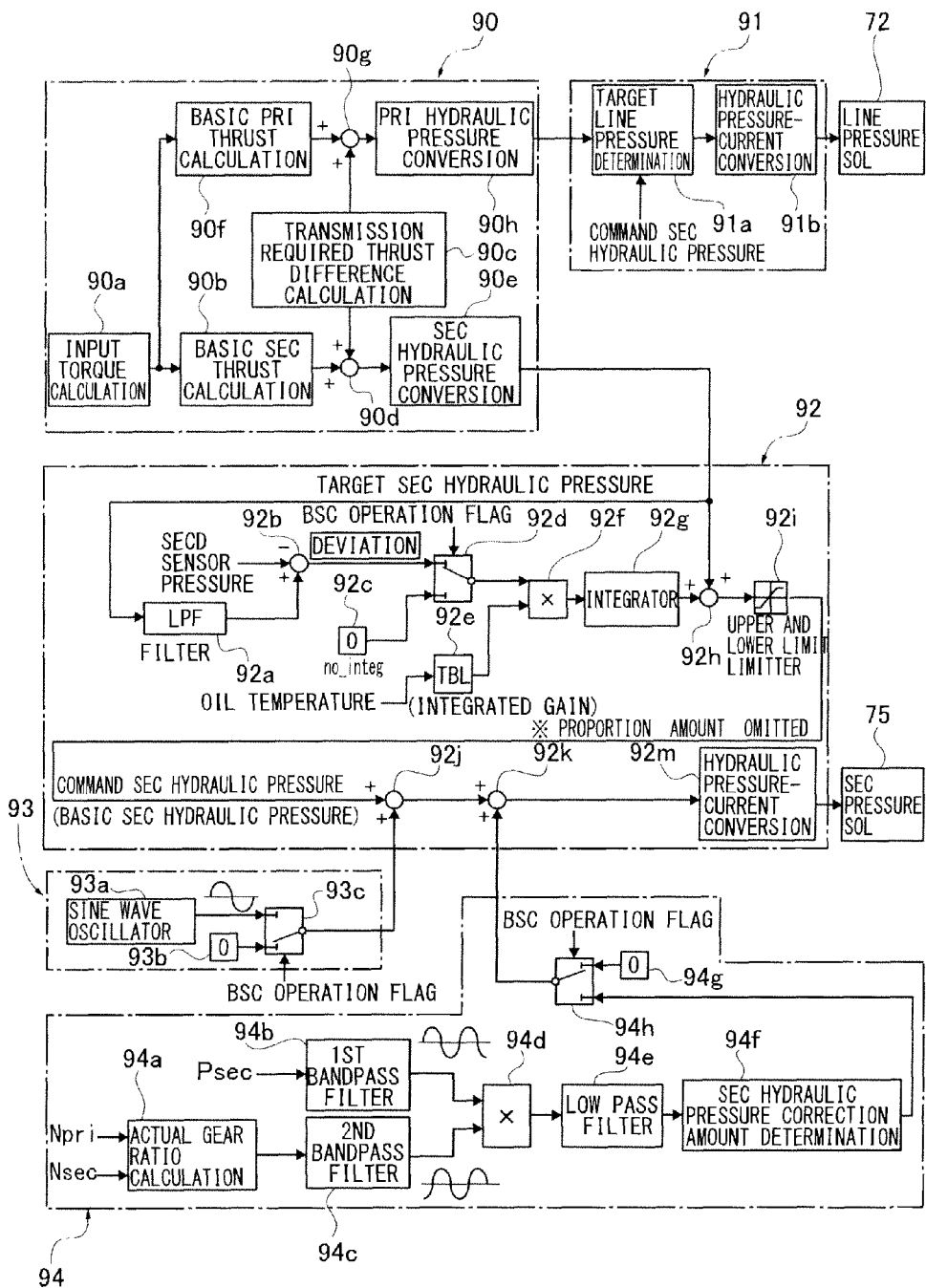
FIG. 4 is a control block diagram of the line pressure control and secondary hydraulic pressure control (normal control/belt slip control) executed by a CVT control unit 8 according to the first embodiment.

FIG. 4 is a control block diagram of the line pressure control and secondary hydraulic pressure control (normal control/belt slip control) executed by the CVT control unit 8 according to the first embodiment.

The hydraulic pressure control system of the CVT control unit 8 in the first embodiment comprises a basic hydraulic pressure calculator 90, a line pressure controller 91, a secondary hydraulic pressure controller 92, a sine wave oscillation controller 93, and a secondary hydraulic pressure corrector 94, as shown in FIG. 4.

The basic hydraulic pressure calculator 90 includes an input torque calculator 90a to calculate transmission input torque on the basis of the torque information (engine rotary rate, fuel injection time and the like) from the engine control unit 88 (FIG. 1), a basic secondary thrust calculator 90b to calculate a basic secondary thrust (belt clamp force necessary for the secondary pulley 43) from the transmission input torque obtained by the input torque calculator 90a, a transmission required thrust difference calculator 90c to calculate a thrust difference required for transmission (a difference in belt clamp force between the primary and secondary pulleys 42, 43), a corrector 90d to correct the calculated basic secondary thrust on the basis of the required thrust difference for transmission, and a secondary hydraulic pressure converter 90e to covert the corrected secondary thrust to a target secondary hydraulic pressure. It further includes a basic primary thrust calculator 90f to calculate a basic primary thrust (belt clamp force required for the primary pulley 42) from the transmission input torque calculated by the input torque calculator 90a, a corrector 90g to correct the calculated basic primary thrust on the basis of the required thrust difference for transmission calculated by the transmission required thrust difference calculator 90c, and a primary hydraulic pressure converter 90h to convert the corrected primary thrust to a target primary hydraulic pressure.

The line pressure controller 91 includes a target line pressure determiner 91a to compare the target primary hydraulic pressure output from the primary hydraulic pressure converter 90h with the command secondary hydraulic pressure output from the secondary hydraulic pressure controller 92, and set the target line pressure to the target primary hydraulic pressure when the target primary hydraulic pressure≥the command secondary hydraulic pressure and set the target line pressure to the secondary hydraulic pressure when the target primary hydraulic pressure<the command secondary hydraulic pressure, and a hydraulic pressure-current converter 91b to convert the target line pressure determined by the target line pressure determiner 91a to a current value applied to the solenoid and output a command current value converted to the line pressure solenoid 72 of the regulator valve 71.

In the normal control the secondary hydraulic pressure controller 92 performs the feedback control using the actual secondary hydraulic pressure detected by the secondary hydraulic pressure sensor 82 to acquire a command secondary hydraulic pressure while in the belt slip control it performs open control without using the actual secondary hydraulic pressure to acquire the command secondary hydraulic pressure. It includes a low pass filter 92a through which the target secondary hydraulic pressure from the secondary hydraulic pressure converter 90e is filtered, a deviation calculator 92b to calculate a deviation between the actual secondary hydraulic pressure and the target secondary hydraulic pressure, a zero deviation setter 92c to set the deviation to zero, a deviation switch 92d to selectively switch between the calculated deviation and zero deviation, and an integrated gain determiner 92e to determine an integrated gain from oil temperature. Further, it includes a multiplier 92f to multiply the integrated gain from the integrated gain determiner 92e and the deviation from the deviation switch 92d, an integrator 92g to integrate an FB integrated control amount from the multiplier 92f, an adder 92h to add the integrated FB integrated control amount to the target secondary hydraulic pressure from the secondary hydraulic pressure converter 90e, and a limiter 92i to set upper and lower limits to the added value to obtain the command secondary hydraulic pressure (referred to basic secondary hydraulic pressure in the belt slip control). Further, it includes an oscillation adder 92j to add a sine wave oscillation command to the basic secondary hydraulic pressure in the belt slip control, a hydraulic pressure corrector 92k to correct the oscillated basic secondary hydraulic pressure by a secondary hydraulic pressure correction amount to the command secondary hydraulic pressure, and a hydraulic pressure-current converter 92m to convert the command secondary hydraulic pressure into a current value applied to the solenoid to output a command current value converted to the secondary hydraulic pressure solenoid 75. Note that the deviation switch 92d is configured to select the calculated deviation when a BSC operation flag is 0 (during the normal control) and select the zero deviation when the BSC operation flag is 1 (during the belt slip control).

The sine wave oscillation controller 93 includes a sine wave oscillator 93a to decide an oscillation frequency and an oscillation amplitude suitable for the belt slip control and apply sine wave hydraulic pressure oscillation in accordance with the decided frequency and amplitude, a zero oscillation setter 93b to apply no sine wave hydraulic pressure oscillation, and an oscillation switch 93c to selectively switch between the hydraulic pressure oscillation and zero oscillation. Note that the oscillation switch 93c is configured to select the zero oscillation when the BSC operation flag is 0 (during the normal control) and select the sine wave hydraulic pressure oscillation when the BSC operation flag is 1 (during the belt slip control).

The secondary hydraulic pressure corrector 94 includes an actual gear ratio calculator 94a to calculate an actual gear ratio Ratio from a ratio of the primary rotary rate Npri of the primary rotation sensor 80 and the secondary rotary rate Nsec of the secondary rotation sensor 81, a first bandpass filter 94b to extract an oscillation component from a signal representing the actual secondary hydraulic pressure Psec obtained with the secondary hydraulic pressure sensor 82, and a second bandpass filter 94c to extract an oscillation component from the calculated data by the actual gear ratio calculator 94a. It further includes a multiplier 94d to multiply the oscillation components extracted by both bandpass filters 94b, 94c, a low pass filter 94e to extract phase difference information from the multiplication result, a secondary hydraulic pressure correction amount determiner 94f to determine a secondary hydraulic pressure correction amount on the basis of the phase difference information from the low pass filter 94e, a zero correction amount setter 94g to set the secondary hydraulic pressure correction amount to zero, and a correction amount switch 94h to selectively switch between the secondary hydraulic pressure correction amount and the zero correction amount. Note that the correction amount switch 94h is configured to select the zero correction amount when the BSC operation flag is 0 (during the normal control) and select the secondary hydraulic pressure correction amount when the BSC operation flag is 1 (during the belt slip control).

Figure 5:
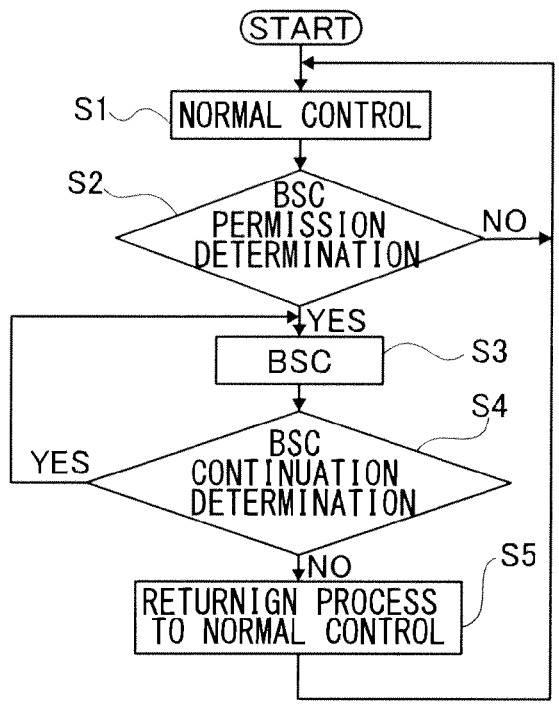
FIG. 5 is a basic flowchart for a switching process between the normal control and the belt slip control (=BSC) over the secondary hydraulic pressure executed by the CVT control unit 8 according to the first embodiment.

FIG. 5 is a basic flowchart for a switching process between the normal control and the belt slip control (=BSC) over the secondary hydraulic pressure executed by the CVT control unit 8 according to the first embodiment. In the following the respective steps in FIG. 5 are described.

In step S1 following a startup by turning-on of the key, the determination on non-BSC permission in step S2 or normal control returning process in step S5, the belt type continuously variable transmission mechanism 4 is normally controlled, and then the flow proceeds to step S2. During the normal control, the BSC operation flag is set to zero and the secondary pressure F/B inhibiting flag is set to zero.

In step S2 following the normal control in step S1, a determination is made on whether or not all of the following, BSC permission conditions are satisfied. At the result being YES (all the BSC permission conditions satisfied), the flow proceeding to step S3, the belt slip control (BSC) is performed. At the result being NO (any of the BSC permission conditions unsatisfied), the flow returning to step S1, the normal control is continued. An example of the BSC permission conditions is as follows:

(1) The transmitted torque capacity of the belt type continuously variable transmission mechanism 4 is stable (a change rate or the transmitted torque capacity is small). This condition (1) is determined by satisfaction of the following two conditions, for example.
a. |command torque change rate|<predetermined value
b. |command gear ratio change rate|<predetermined value
(2) The estimated accuracy of the input torque to the primary pulley 42 is within a reliable range.
This condition (2) is for example determined on the basis or the torque information (estimated engine torque) from the engine control unit 88, the lockup state of the torque converter 2, the operation state of a brake pedal, a range position and the like.
(3) The permitted conditions in the above (1) (2) are continued for a predetermined length of time.
In step S2 whether or not the above conditions (1), (2), (3) are all satisfied is determined.

In step S3 following the BSC permission determination in step S2 or the BSC continuation determination in step S4, the belt slip control (FIG. 6 to FIG. 8) is performed to reduce an input to the belt 44 of the belt type continuously variable transmission mechanism 4 and maintain the belt 44 in an appropriate slip state without slippage. Then, the flow proceeds to step S4. During the belt slip control the operation flag is set to 1 and the secondary pressure F/B inhibiting flag is set to zero.

In step S4 following the belt slip control in step S3, a determination is made on whether or not all of the following BSC continuation conditions are satisfied. At the result being YES (all the BSC continuation conditions satisfied), the flow returning to step S3, the belt slip control (BSC) is continued. At the result being NO (any of the BSC continuation conditions unsatisfied), the flow proceeds to step S5, and the normal control returning process is performed. An example of the BSC continuation conditions is as follows:

(1) The transmitted torque capacity of the belt type continuously variable transmission mechanism 4 is stable (a change rate of the transmitted torque capacity is small).

This condition (1) is determined by satisfaction of the following two conditions, for example.

a. |command torque change rate|<predetermined value
b. |command gear ratio change rate|<predetermined value (2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like. Whether or not the above conditions (1), (2) are both satisfied is determined. That is, a difference between the BSC permission conditions and the BSC continuation conditions is in that the BSC continuation conditions exclude the continuation condition (3) of the BSC permission conditions.

In step S5 following a determination that any of the BSC continuation conditions is unsatisfied, the normal control returning process (FIG. 9 to FIG. 11) is performed to prevent the belt 4 from slipping when the belt slip control is returned to the normal control. Upon completion of the process, the flow returns to step S1 and shifts to the normal control.

Figure 6:
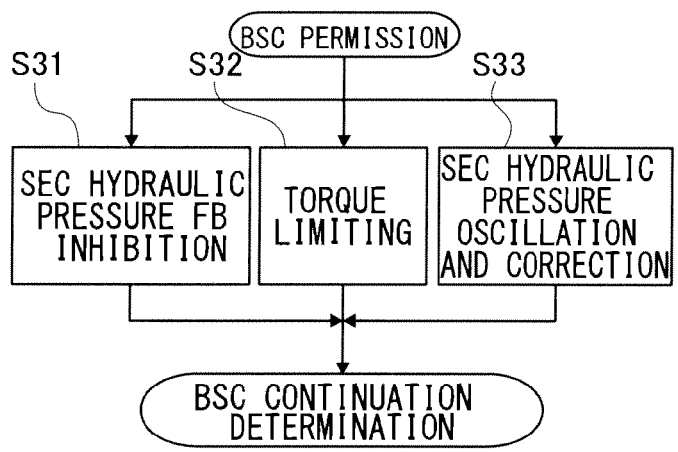
FIG. 6 is a flowchart for the entire belt slip control process executed by the CVT control unit 8 according to the first embodiment.
Figure 7:
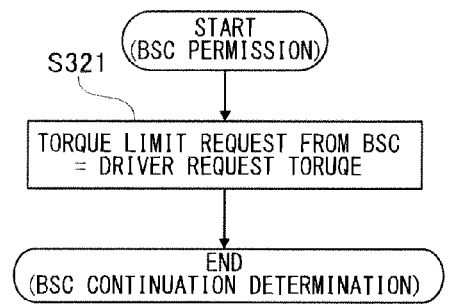
FIG. 7 is a flowchart for the torque limit process of the belt slip control process executed by the CVT control unit 8 according to the first embodiment.
Figure 8:
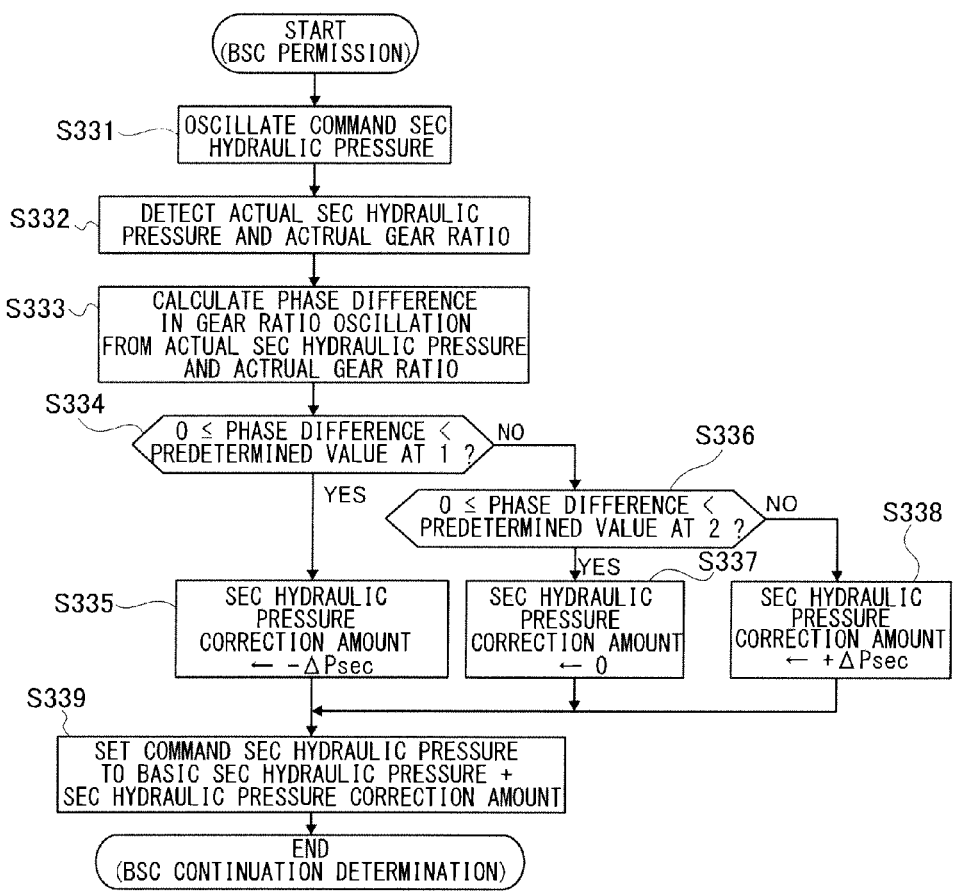
FIG. 8 is a flowchart for the secondary hydraulic pressure oscillation and correction process of the belt slip control process executed by the CVT control unit 8 according to the first embodiment.

FIG. 6 is a flowchart for the entire belt slip control process executed by the CVT control unit 8 according to the first embodiment. FIG. 7 is a flowchart for the torque limit process of the belt slip control process executed by the CVT control unit 8 according to the first embodiment. FIG. 8 is a flowchart for the secondary hydraulic pressure oscillation and correction process of the belt slip control process executed by the CVT control unit 8 according to the first embodiment.

First, as apparent from FIG. 6, during the belt slip control in which the BSC permission determination and the BSC continuation determination are continued, a feedback control inhibition process (step S31) in which the command secondary hydraulic pressure is obtained using the actual secondary hydraulic pressure, a torque limit process (step S32) as a preparation for returning to the normal control, and a secondary hydraulic pressure oscillation and correction process (step S33) for the belt slip control are concurrently performed.

In step S31 during the belt slip control in which the BSC permission determination and the BSC continuation determination are continued, the feedback control under which the command secondary hydraulic pressure is obtained using the actual secondary hydraulic pressure detected by the secondary hydraulic pressure sensor 82 is inhibited. That is, for obtaining the command secondary hydraulic pressure, the feedback control during the normal control is inhibited and switched to the open control of the belt slip control using the zero deviation. Then, when the belt slip control is shifted to the normal control, the feedback control returns again.

In step S32 during the belt slip control in which the BSC permission determination and the BSC continuation determination are continued, the torque limit process in FIG. 7 is performed. In step S321 of the flowchart in FIG. 7 a "torque limit request from the belt slip control" is defined to be the driver request torque.

In step S33 during the belt slip control in which the BSC permission determination and the BSC continuation determination are continued, the secondary hydraulic pressure is oscillated and corrected in FIG. 8. In the following the steps of the flowchart in FIG. 8 are described.

In step S331 the command secondary hydraulic pressure is oscillated. That is, the sine wave hydraulic pressure with predetermined amplitude and predetermined frequency is superimposed on the command secondary hydraulic pressure. The flow proceeds to step S332.

In step S332 following the oscillation of the command secondary hydraulic pressure in step S331, the actual secondary hydraulic pressure is detected with the secondary hydraulic pressure sensor 82 to detect the actual gear ratio by calculation based on information on the rotary rates from the primary rotation sensor 80 and the secondary rotation sensor 81. The flow proceeds to step S333.

In step S333 following the detection of the actual secondary hydraulic pressure and the actual gear ratio in step S332, the actual secondary hydraulic pressure and the gear ratio are each subjected to the bandpass filter process to extract their respective oscillation components (sine wave) and multiply them. Then, the multiplied value is subjected to the low pass filter process and converted to a value expressed by amplitude and a phase difference θ (cosine wave) between the oscillation of the actual secondary hydraulic pressure and that of the actual gear ratio. The flow proceeds to step S334. Herein, where A is the amplitude of the actual secondary hydraulic pressure and B is the amplitude of the actual gear ratio, the oscillation of the actual secondary hydraulic pressure is expressed by the formula (1): $A \sin \omega t$. The oscillation of the actual gear ratio is expressed by the formula (2): $B \sin(\omega t+\theta)$. The formulas (1) and (2) are multiplied, and using the following product sum formula (3):

$$\sin \alpha \sin \beta = -\tfrac{1}{2}\{\cos(\alpha+\beta)-\cos(\alpha-\beta)\}$$

the following formula (4):

$$A \sin \omega t \times B \sin(\omega t+\theta) = (\tfrac{1}{2})AB \cos \theta - (\tfrac{1}{2})AB \cos(2\omega t+\theta)$$

is obtained.

In the formula (4), $(\tfrac{1}{2})AB \cos(2\omega t+\theta)$ as the double component of the oscillation frequency is reduced through the low pass filter so that the formula (4) becomes the following formula (5):

$$A \sin \omega t \times B \sin(\omega t+\theta) \approx (\tfrac{1}{2})Ab \cos \theta$$

Thus, it can be expressed by the formula of the phase difference θ in the oscillation between the actual secondary hydraulic pressure and the actual gear ratio In step S334 following the calculation of the phase difference θ in the oscillation between the actual secondary hydraulic pressure and the actual gear ratio, a determination is made on whether or not the phase difference θ is such that 0≤phase difference θ<predetermined value at 1 (micro slip range). At the result being YES (0≤phase difference θ<predetermined value at 1), the flow proceeds to step S335 while at the result being NO (predetermined value at 1≤phase difference θ), the flow proceeds to step S336.

In step S335 following the determination on 0≤phase difference θ<predetermined value at 1 (micro slip range) in step S334, the secondary hydraulic pressure correction amount is set to −Δpsec. The flow proceeds to step S339.

In step S336 following the determination on predetermined value at 1≤phase difference θ in step S334, a determination is made on whether or not the phase difference θ is such that predetermined value at 1≤phase difference θ<predetermined value at 2 (target slip range). At the result being YES (predetermined value at 1≤phase difference θ<predetermined value at 2), the flow proceeds to step S337 while at the result being NO (predetermined value at 2≤phase difference θ), the flow proceeds to step S338.

In step S337 following the determination on predetermined value at 1≤phase difference θ<predetermined value at 2 (target slip range) in step S336, the secondary hydraulic pressure correction amount is set to zero and the flow proceeds to step S339.

In step S338 following the determination on predetermined value at 2≤phase difference θ (micro/macro slip transition range) in step S336, the secondary hydraulic pressure correction amount is set to +ΔPsec and the flow proceeds to step S339.

In step S339 following the setting of the secondary hydraulic pressure correction amounts in steps S335, S337, S338, the command secondary hydraulic pressure is set to the value of the basic secondary hydraulic pressure+secondary hydraulic pressure correction amount. Then, the flow ends.

Figure 9:
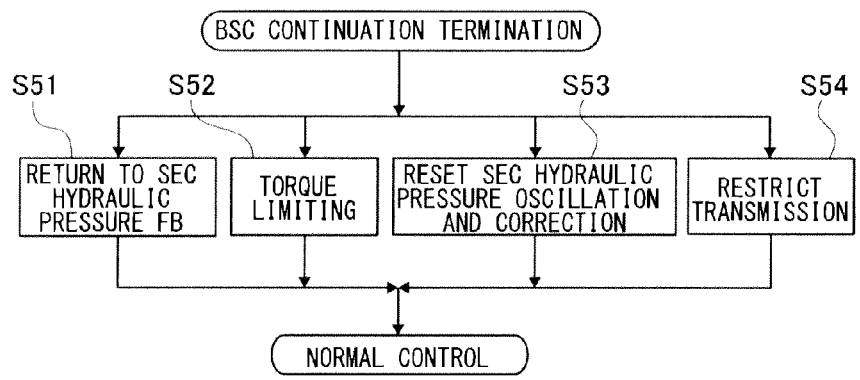
FIG. 9 is a flowchart for a returning process from the belt slip control to the normal control executed by the CVT control unit 8 according to the first embodiment.
Figure 10:
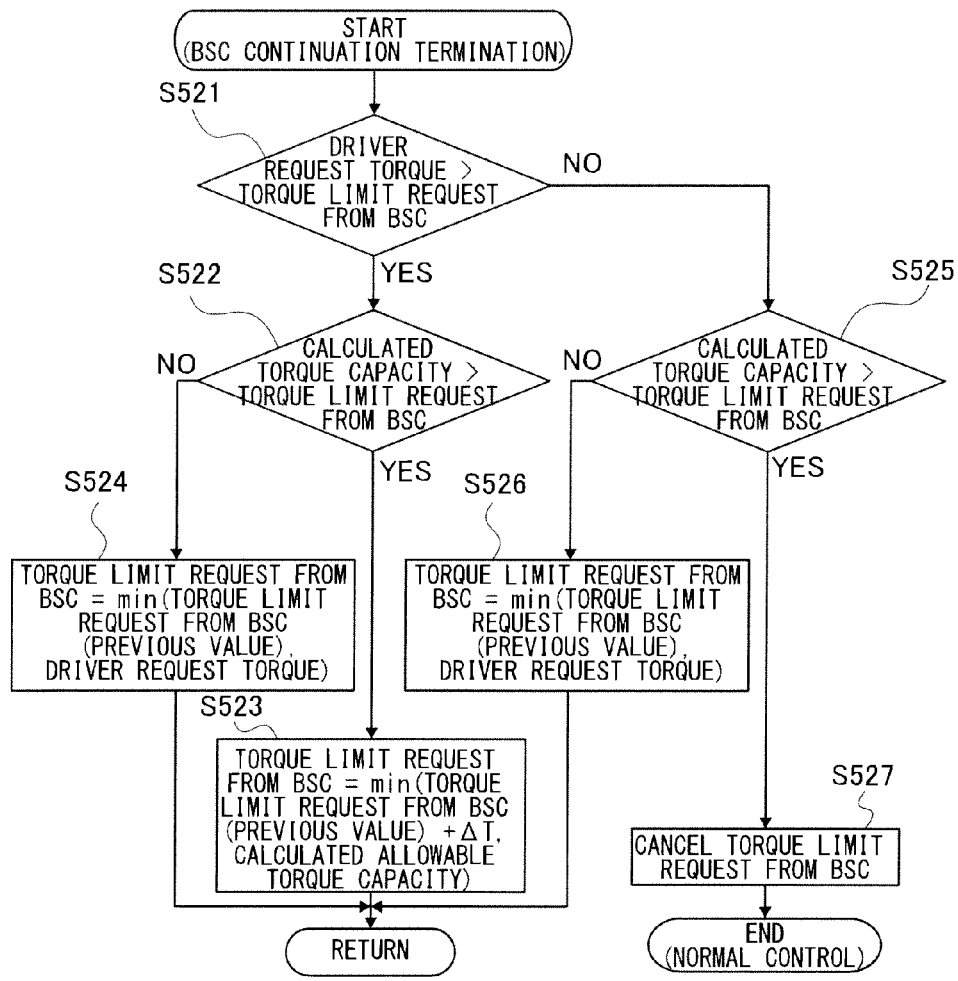
FIG. 10 is a flowchart for the torque limit process of the returning process to the normal control executed by the CVT control unit 8 according to the first embodiment.
Figure 11:
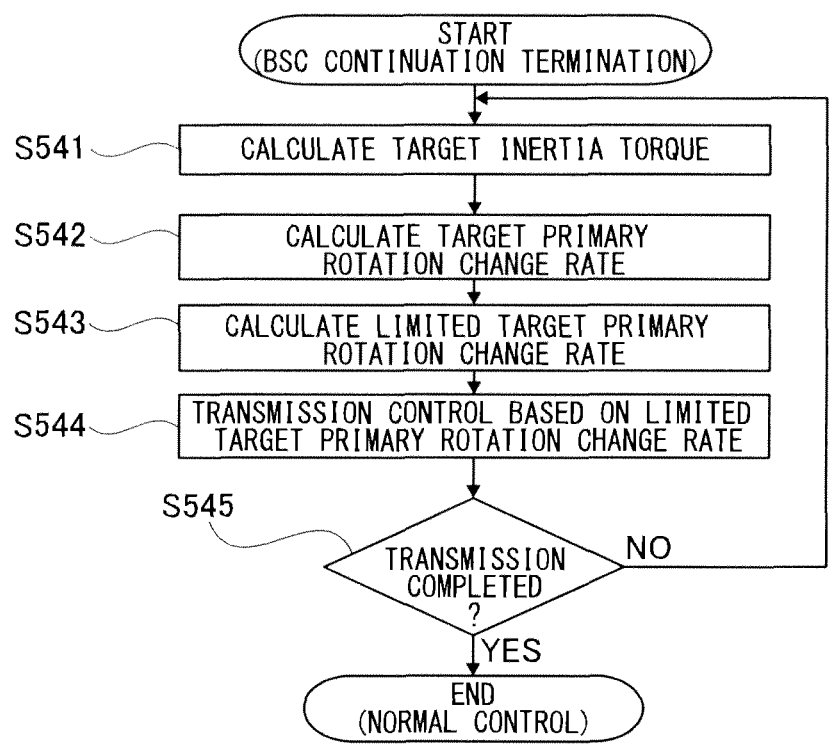
FIG. 11 is a flowchart for limiting process for the transmission speed of a gear ratio to limit a target primary rotary rate in the returning process to the normal control executed by the CVT control unit 8 according to the first embodiment.

FIG. 9 is a flowchart for a returning process from the belt slip control to the normal control executed by the CVT control unit 8 according to the first embodiment. FIG. 10 is a flowchart for the torque limit process of the returning process to the normal control executed by the CVT control unit 8 according to the first embodiment. FIG. 11 is a flowchart for limiting process for the transmission speed of a gear ratio to limit a target primary rotary rate in the returning process to the normal control executed by the CVT control unit 8 according to the first embodiment.

First, as apparent from FIG. 9, while the normal control is returned from the belt slip control from the BSC continuation termination to the start of the normal control, a feedback control returning process (step S51) in which the command secondary hydraulic pressure is obtained using the actual secondary hydraulic pressure, a torque limit process (step S52) as a preparation for returning to the normal control, an oscillation and correction secondary hydraulic pressure resetting process (step S53) for the belt slip control, and a transmission restricting process (step S54) in which the transmission speed is restricted are concurrently performed.

In step S51, while the normal control is returned from the belt slip control from the BSC continuation termination to the start of the normal control, the feedback control in which the command secondary hydraulic pressure is obtained using the actual secondary hydraulic pressure detected by the secondary hydraulic pressure sensor 82 is returned.

In step S52 While the normal control is returned from the belt slip control from the BSC continuation termination to the start of the normal control, the torque limit process as a preparation for returning to the normal control in FIG. 10 is performed.

In step S53 while the normal control is returned from the belt slip control from the BSC continuation termination to the start of the normal control, the secondary hydraulic pressure oscillation and correction in FIG. 8 is reset to wait for the normal control.

In step S54 while the normal control is returned from the belt slip control from the BSC continuation termination to the start of the normal control, the transmission restricting process in which the transmission speed is restricted in FIG. 11 is performed.

In the following the steps of the flowchart showing the torque limit process in FIG. 10 are described. The key point of this torque limit process is to switch the controls on the basis of a magnitude relation among the three values of driver request torque, torque limit request from the BSC, and torque capacity (calculated torque capacity). Herein, the driver request torque refers engine torque requested by a driver, torque limit request from the BSC refers to torque limit amount shown in the phases (2), (3) in FIG. 16. Torque capacity is generally an allowable designed torque capacity and set to a value higher than the driver request torque by a margin with mechanical variation of the belt type continuously variable transmission mechanism 4 taken into consideration, for the purpose of preventing the belt slip. Herein, the actual torque capacity is controlled under the secondary hydraulic pressure control. Further the calculated torque capacity refers to a torque capacity during the returning process (phase (3) in FIG. 16) of the BSC (phase (2) in FIG. 16). The calculated torque capacity is specifically a value based on or calculated from the actual secondary hydraulic pressure and the actual gear ratio torque capacity of one of the two pulleys 42, 43 to which engine torque is input, that is, the primary pulley 42).

In step S521 a determination is made on whether or not the driver request torque is larger than the torque limit request from the BSC. At the result being YES, the flow proceeds to step S522 while at the result being NO, the flow proceeds to step S525.

In step S522 following the determination on the driver request torque is larger than the torque limit request from the BSC in step S521, a determination is made on whether or not the calculated torque capacity is larger than the torque limit request from the BSC. At the result being YES, the flow proceeds to step S523 while at the result being NO, the flow proceeds to step S524.

In step S523 following the determination on the calculated torque capacity>the torque limit request from the BSC in step S522, the torque limit request from the BSC is set to a smaller one of the torque limit request from the BSC (previous value)+ΔT and the calculated allowable torque capacity. The flow proceeds to RETURN.

In step S524 following the determination on the calculated torque capacity≤the torque limit request from the BSC in step S522, the torque limit request from the BSC is set to a smaller one of the torque limit request from the BSC (previous value) and the driver request torque. The flow proceeds to RETURN.

In step S525 following the determination on the driver request torque≤the torque limit request from the BSC in step S521, a determination is made on whether or not the calculated torque capacity is larger than the torque limit request from the BSC. At the result being YES, the flow proceeds to step S527 while at the result being NO, the flow proceeds to step S526.

In step S526 following the determination on the calculated torque capacity≤the torque limit request from the BSC in step S525 the torque limit request from the BSC is set to a smaller one of the torque limit request from the BSC (previous value) and the driver request torque. The flow proceeds to RETURN.

In step S527 following the determination on the calculated torque capacity>the torque limit request from the BSC in step S525, the torque limit request from the BSC is cancelled. The flow ends.

In the following the steps of the flowchart showing the limiting process for the transmission speed of a gear ratio to limit a target primary rotary rate in FIG. 11 are described.

In step S541 a target inertia torque is calculated. The flow proceeds to step S542.

In step S542 following the calculation of the target inertia torque in step S541, a target primary rotation change rate is calculated from the target inertia torque. Then, the flow proceeds to step S543.

In step S543 following the calculation of the target primary rotation change rate in step S542, a limited target primary rotary rate not exceeding the target primary rotation change rate is calculated, and the flow proceeds to step S544.

In step S544 following the calculation of the limited target primary rotation change rate in step S543, the transmission control is performed on the basis of the limited target primary rotary rate, and the flow proceeds to step S545.

In step S545 following the transmission control in step S544, a determination is made on whether or not the transmission control based on the limited target primary rotary rate is completed or the actual primary rotary rate has reached the limited target primary rotary rate. At the result being YES (completion of transmission control), the flow ends while at the result being NO (in the middle of transmission control), the flow returns to step S541.

Next, the operation of the control device and method for the belt type continuously variable transmission mechanism 4 according to the first embodiment is described. It will be divided into five parts. BSC permission and continuation determining operations, belt slip control operation (BSC operation), secondary hydraulic pressure feedback control inhibiting operation during BSC, torque limit operation in the returning control from the BSC to the normal control, and primary rotation increase rate limiting operation in the returning control operation from the BSC to the normal control.

[BSC Permission and Continuation Determining Operations]

At a start of the vehicle's running, the operation proceeds to step S2 from step S1 in the flowchart in FIG. 5. Unless all the BSC permission determining conditions are satisfied in step S2, the flow from step S1 to step S2 are repeated to continue the normal control. That is, the satisfaction of all the BSC permission determining conditions in step S2 is defined to be BSC control starting condition.

The BSC permission conditions in the first embodiment are as follows:

(1) The transmitted torque capacity of the belt type continuously variable transmission mechanism 4 is stable (a change rate of the transmitted torque capacity is small). This condition (1) is determined by satisfaction of the following two conditions, for example.
  a. |command torque change rate|<predetermined value
  b. |command gear ratio change rate|<predetermined value (2) The estimated accuracy of the input torque to the primary pulley 42 is within a reliable range.
This condition (2) is for example determined on the basis of the torque information (estimated engine torque) from the engine control unit 88, the lockup state of the torque converter 2, the operation state of a brake pedal, a range position and the like.

(3) The permitted conditions in the above (1) (2) are continued for a predetermined length of time.

In step S2 whether or not the above conditions (1), (2), (3) are all satisfied is determined.

Thus, the belt slip control is allowed to start if the transmission torque capacity of the belt type continuously variable transmission mechanism 4 continues to be stable and the estimated accuracy of the input torque to the primary pulley 42 is continuously within a reliable range for a predetermined length of time during the normal control.

As above, the belt slip control is permitted to start upon the satisfaction of all the BSC permission conditions so that it is able to start the belt slip control in a preferable range with an assured high control precision.

After the BSC permission is determined in step S2, in step S3 the belt slip control is performed to reduce an input to the belt 44 of the belt type continuously variable transmission mechanism 4 and maintain the belt 44 in an appropriate slip state without slippage. Then, in step S4 following the belt slip control in step S3, a determination is made on whether or not all of the BSC continuation conditions are satisfied. As long as all of the BSC continuation conditions are satisfied, the flow from step S3 to step S4 is repeated to continue the belt slip control (BSC).

Here, the BSC continuation conditions are the BSC permission conditions (1), (2) and exclude the continuation condition for a predetermined length of time (3) of the BSC permission conditions. Because of this, it is made possible to prevent continuation of the belt slip control with unsecured control precision since the belt slip control is immediately stopped and returned to the normal control if one of the conditions (1), (2) is unsatisfied during the belt slip control.

[Belt Slip Control Operation (BSC Operation)]

At start of the belt slip control, the secondary hydraulic pressure is set to a value to acquire the clamp force not to cause belt slippage with estimated safety so that the condition that the phase difference θ is lower than the predetermined value 1 is satisfied. In the flowchart in FIG. 8 the flow from step S331→step S332→step S333→step S334→step S335 to step S339 is repeated and every time the flow is repeated, the command secondary hydraulic pressure is decreased in response to the correction by −Δpsec. Then, until the phase difference θ at 1 or more reaches the predetermined value at 2, the flow proceeds from step S331→step S332→step S333→step S334→step S336→step S337 to step S339 in FIG. 8 to maintain the command secondary hydraulic pressure. At the phase difference θ being the predetermined value at 2 or more, the flow proceeds from step S331→step S332→step S333→step S334→step S336 step S338 to step S339 to increase the command secondary hydraulic pressure in response to the correction by +Δpsec. Under the belt slip control the slip rate is maintained so that the phase difference θ falls within the range of the predetermined values from 1 or more to less than 2.

The belt slip control is described With reference to the timing chart in FIG. 12. At time t1, the above BSC permission conditions (1), (2) are satisfied and continued (BSC permission condition (3)). From time t2 to time t3, at least one of the above BSC continuation conditions (1), (2) becomes unsatisfied, and the BSC operation flag and SEC pressure F/B inhibiting flag (secondary pressure feedback inhibiting flag) are set for the belt slip control. A little before time t3 the accelerator is pressed, so that at least one of the BSC continuation conditions becomes unsatisfied and the control to return to the normal control is performed from time t3 to time t4. After time t4, the normal control is performed.

Figure 12:
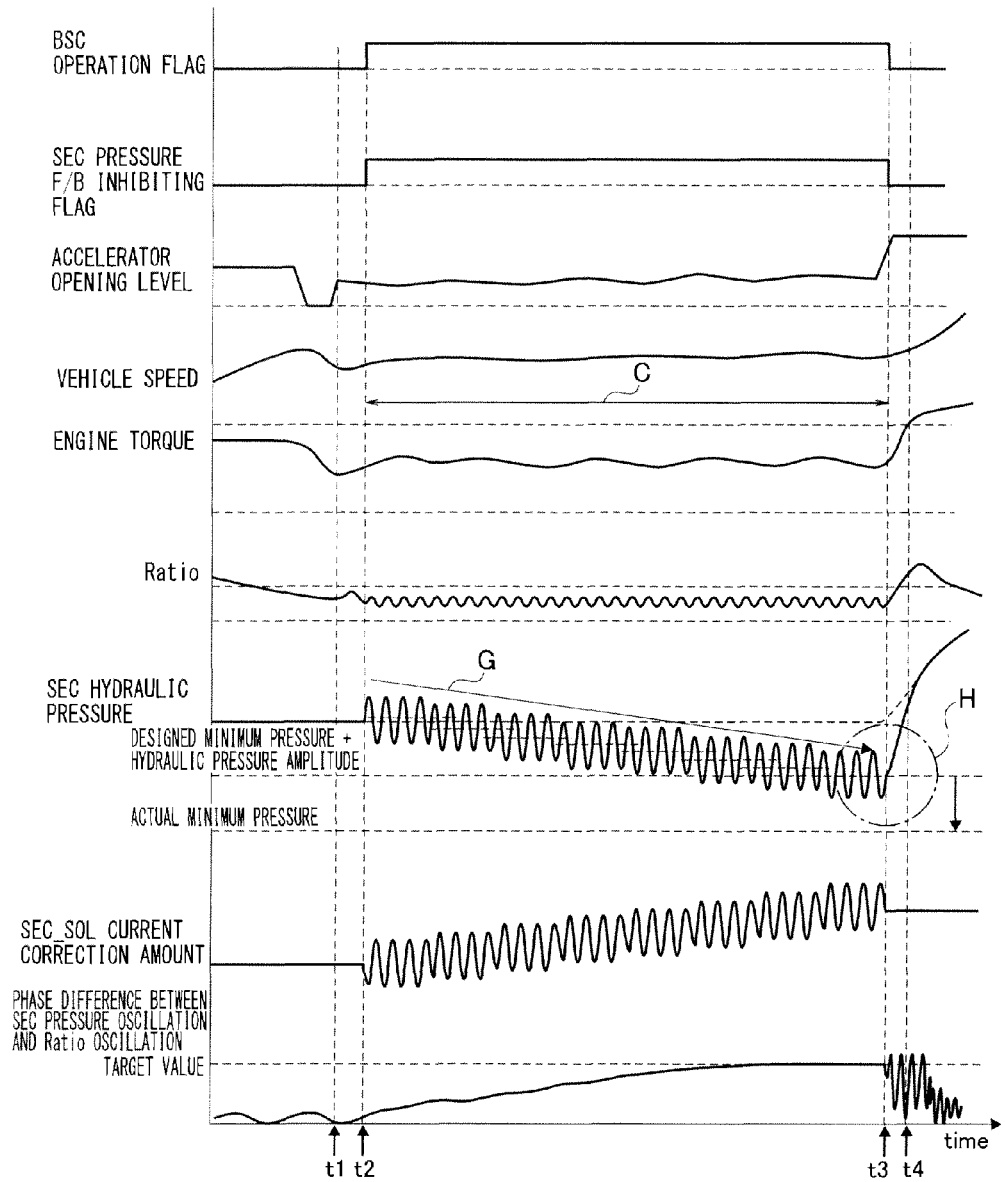
FIG. 12 is a timing chart of the respective characteristics of BSC operation flag, SEC pressure F/B inhibition flag, accelerator opening, vehicle speed, engine torque, Ratio, SEC hydraulic pressure, SEC_SOL current correction amount, and phase difference between SEC pressure oscillation and Ratio oscillation in a traveling scene during a control shift from the normal control, belt slip control, returning control to the normal control.

Thus, as apparent from the accelerator opening characteristic, vehicle speed characteristic, and engine torque characteristic as well as the solenoid current correction amount characteristic of the secondary hydraulic pressure solenoid 75 during steady running determination indicated by the arrow E in FIG. 12, under the belt slip control the phase difference θ between the oscillation components of the secondary hydraulic pressure due to the oscillation and the gear ratio is monitored to increase or decrease the current value. Note that the secondary hydraulic pressure solenoid 75 is normally open (always open) and decreases the secondary hydraulic pressure along with a rise of the current value.

The actual gear ratio is maintained to be virtually constant by the belt slip control although it fluctuates with small amplitude as shown in the actual gear ratio characteristic (Ratio) in FIG. 12. The phase difference θ, as shown in the phase difference characteristics of the SEC pressure oscillation and Ratio oscillation in FIG. 12, gradually increases with time from time t2 when the slip rate is approximately zero, and reaches a target value (target slip rate). The secondary hydraulic pressure as shown in the SEC hydraulic pressure characteristic in FIG. 12 decreases with time from time t2 when safety is secured, as indicated by the arrow F, and reaches a value of the designed minimum pressure added with hydraulic pressure amplitude in the end which is in the hydraulic pressure level with a margin to the actual minimal pressure. While the belt slip control continues for a long time, the actual secondary hydraulic pressure is maintained in the amplitude range of the designed minimum pressure plus hydraulic pressure to maintain the target value of the phase difference θ (of slip rate).

Thus, a decrease in the secondary hydraulic pressure by the belt slip control results in reducing the belt friction acting on the belt 44 and reducing the drive load on the belt type continuously variable transmission mechanism 4 by the reduction in the belt friction. As a result, it is possible to improve the practical fuel efficiency of the engine 1 without affecting the travelling performance during the belt slip control based on the BSC permission determination.

[Secondary Hydraulic Pressure Feedback Control Inhibiting Operation during BSC]

The feedback control inhibiting operation in which during the belt slip control from start to end, the command secondary hydraulic pressure is obtained without using the actual secondary hydraulic pressure and the feedback control over the command secondary hydraulic pressure is inhibited is described.

First, irrespective of in the normal control or the belt slip control, the deviation calculator 92b of the secondary hydraulic pressure controller 92 calculates a deviation between the actual secondary hydraulic pressure obtained by a pressure signal from the secondary hydraulic pressure sensor 82 and a target secondary hydraulic pressure filtered through the low pass filter 92a.

In the normal control in which the BSC operation flag=zero, the deviation switch 92d selects the calculated deviation as shown in FIG. 4. Therefore, the multiplier 92f multiplies an integrated gain from the integrated gain determiner 92e and a deviation from the deviation calculator 92b to calculate an FB integrated control amount. The next integrator 92g integrates the FB integrated control amount. Then, the adder 92h adds the integrated control amount and an FB proportional control amount (omitted) to the target secondary hydraulic pressure from the secondary hydraulic pressure converter 90e. The limiter 92i applies the upper and lower limits to the added value to obtain the command secondary hydraulic pressure. That is, the command secondary hydraulic pressure is obtained by feedback control (PI control) using the actual secondary hydraulic pressure detected by the secondary hydraulic pressure sensor 82.

Meanwhile, in the belt slip control the BSC operation flag=1, so that the deviation switch 92d of the secondary hydraulic pressure controller 92 selects the zero deviation. Therefore, the multiplier 92f multiplies an integrated gain from the integrated gain determiner 92e and the zero deviation to calculate the FB integrated control amount to zero. The next integrator 92g integrates the zero FB integrated control amount and maintains a previous FB integrated control amount immediately before the start of the belt slip control. Then, the adder 92h adds the previously integrated feedback control amount (=FB integrated control amount) to the target secondary hydraulic pressure from the secondary hydraulic pressure converter 90e. The limiter 92i applies the upper and lower limits to the added value to obtain the command secondary hydraulic pressure. That is, with the deviation set to zero, the command secondary hydraulic pressure is obtained by the open control without using the actual secondary hydraulic pressure.

For example, for obtaining the command secondary hydraulic pressure using the actual secondary hydraulic pressure information during the belt slip control, the feedback control amount is continuously added in accordance with the deviation which varies due to the oscillation component included in the actual secondary hydraulic pressure. This unstabilizes the secondary hydraulic pressure control. Especially, oscillating the actual secondary hydraulic pressure with a single frequency in the belt slip control may cause the secondary hydraulic pressure to be diffused by the feedback control.

In general the diffusion or non-diffusion of the actual secondary hydraulic pressure is determined by hydraulic pressure feedback control, frequency responsiveness of the transmission control, and hardware responsiveness. Thus, in oscillating the secondary hydraulic pressure with a single frequency, it is necessary to set the oscillation frequency with the hydraulic pressure feedback control and frequency responsiveness of the transmission control taken into account or determine the hydraulic pressure feedback control and frequency responsiveness of the transmission control in accordance with the oscillation frequency. However, in either way the control is complicated.

To the contrary, according to the first embodiment, without use of the actual secondary hydraulic pressure information during the belt slip control, it is allowable that the oscillation component is included or purposefully included in the actual secondary hydraulic pressure. In other words, the estimated accuracy of the belt slip condition can be ensured by monitoring the phase difference θ in the oscillation components between the actual secondary hydraulic pressure and the actual gear ratio. Particularly, the oscillation of the actual secondary hydraulic pressure does not affect the secondary hydraulic pressure control, which enables acquirement of accurate phase differences θ in the oscillation component between the actual secondary hydraulic pressure and the actual gear ratio. By monitoring these phase differences, it is made possible to reliably determine the range immediately before the belt slip occurs.

In addition, according to the first embodiment the secondary hydraulic pressure is controlled under the open control not using the feedback information (actual secondary hydraulic pressure information) during the belt slip control. This can prevent the secondary hydraulic pressure control from becoming unstable or diverged unlike maintaining the feedback control during the belt slip control.

Moreover, in the secondary hydraulic pressure control according to the first embodiment, only the deviation is set to zero during the belt slip control and the secondary hydraulic pressure is under the open control using a constant feedback control amount maintained at the feedback control amount immediately before shift to the belt slip control.

For example, under the open control using the feedback control amount at zero during the belt slip control, a large feedback control amount containing stationary deviation is added to the target secondary hydraulic pressure at the time when the belt slip control shifts to the normal control. Because of this, the presence or absence of the feedback control amount causes a discontinuous drop in the secondary hydraulic pressure. A large drop in the hydraulic pressure may cause an impact on an occupant, making him or her feel a sense of discomfort.

To the contrary, setting only the deviation at zero and performing the open control of the secondary hydraulic pressure using a constant feedback control amount makes the secondary hydraulic pressure smoothly, continuously rise as shown in H area at time t3 in FIG. 12 when the belt slip control shifts to the normal control. Accordingly, in returning from the open control to the feedback control, it is possible to prevent the occupant from feeling discomfort due to the drop in the secondary hydraulic pressure.

[Torque Limit Operation in Returning Control from BSC to Normal Control]

During the belt slip control while the BSC per fission and continuation determinations are continued, the torque limit process in step S32 in FIG. 6 is performed by setting the "torque limit request from the belt slip control" as the driver request toque in step S321 in FIG. 7. In the following torque limit operation for returning to the normal control is described with reference to FIG. 10 and FIG. 13.

The engine control unit 88 has a limit torque amount as an upper control limit engine torque, and controls the actual torque of the engine 1 not to exceed the limit torque amount. This limit torque amount is determined according to various requests. For example, the upper limit input torque to the belt type continuously variable transmission mechanism 4 is set to the torque limit request during the normal control (phase (1) in FIG. 13), and the CVT control unit 8 sends the torque limit request during the normal control to the engine control unit 88. The engine control unit 88 selects the minimum one of torque limit requests from various controllers as the limit torque amount.

Figure 13:
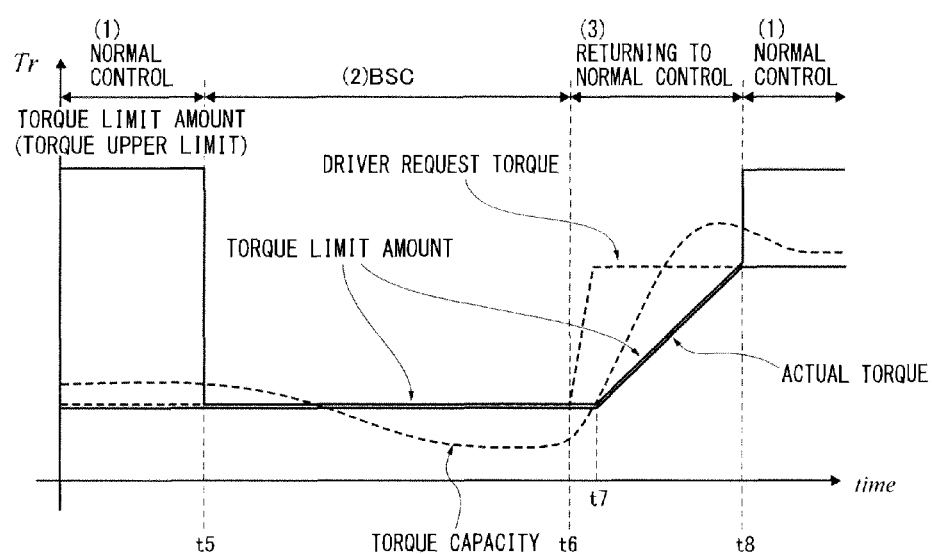
FIG. 13 is a timing chart of the characteristics of driver request torque, torque limit amount, torque capacity, and actual torque to illustrate the torque limit control based on torque delay used in the returning control from the belt slip control to the normal control.

Specifically, at time t5 the phase (1) of the normal control is shifted into the belt slip control, and the torque limit request from the BSC is sent to the engine control unit 88 in the phase (2) as shown in the limit torque amount characteristic in FIG. 13. However, the torque limit request from the BSC during the BSC (phase (2) in FIG. 13) is for preparation in advance for the torque limiting in FIG. 10 and does not virtually function as a torque limit during the BSC (phase (2) in FIG. 13).

Then, at time to the BSC continuation is aborted and shifted into the control to return to the normal control. At time t6 a torque limit request is issued because of the driver request torque>torque limit request from the BSC and the calculated torque capacity≤torque limit request from the BSC. Therefore, the flow from step S521→step S522→step S524 to RETURN in the flowchart in FIG. 10 is repeated to maintain the torque limit request from the BSC (previous value) in step S524.

Thereafter, at time t7 the driver request torque>torque limit request from the BSC and the calculated torque capacity>torque limit request from the BSC. The flow from step S521→step S522→step S523 to RETURN in FIG. 10 is repeated to gradually increase the torque limit request from the BSC to he (previous value+ΔT). Along with this rising gradient, the actual torque gradually rises.

Due to the rise of the torque limit request from the BSC since time t7, at time t8 the driver request torque≤torque limit request from the BSC and the calculated torque capacity>torque limit request from the BSC. The flow proceeds from step S521→step S525→step S527 to END in the flowchart in FIG. 10. In step S527 the torque limit from the BSC is cancelled.

In this example the flow skips step S526 which is executed when the accelerator is manipulated as stepped on or returned (released) for a short period of time. Specifically, step S526 is skipped when the belt slip control is cancelled by stepping-on of the accelerator and the accelerator is released as soon as the returning control starts.

In the belt slip control the belt is positively slipped in an allowable slip range so that the belt clamp force is reduced from that in the normal control. In returning from the belt slip control to the normal control, an increase in the input torque to the belt type continuously variable transmission 4 until it exceeds the belt clamp force may cause an excessively large belt slip.

To the contrary, in transition from the belt slip control to the normal control, that is, from time t6 to time t7 in FIG. 13, an increasing speed of the input torque is limited so as to maintain the actual torque at completion of the belt slip control. By suppressing the rise in the input torque, the input torque to the belt type continuously variable transmission mechanism 4 is prevented from becoming excessively large relative to the belt clamp force while the belt clamp force is returned to the level in the normal control from that at completion of the belt slip control.

Owing to the torque limit control for limiting the changing speed of the input torque to the belt type continuously variable transmission mechanism 4 in returning from the belt slip control to the normal control, it is possible to prevent the input torque to the belt type continuously variable transmission mechanism 4 from becoming excessively large relative to the belt clamp force and prevent the belt 44 from slipping.

Particularly, according to the first embodiment, under a simple torque limit control for maintaining the input torque to the belt type continuously variable transmission mechanism 4 at completion of the belt slip control, it is possible to reliably prevent the input torque to the belt type continuously variable transmission mechanism 4 from becoming excessively large relative to the belt clamp force.

[Primary Rotation Increase Rate Limiting Operation in Returning Control Operation from BSC to Normal Control]

In the returning control from the belt slip control to the normal control, if the gear ratio of the belt type continuously variable transmission mechanism 4 is changed at normal transmission speed under the above torque limit control while the change speed of the input torque thereto is reduced, the input torque conspicuously decreases due to a change in rotary inertia. This may cause a driver to feel unnecessary deceleration (pull shock). In view of this, the changing speed of the gear ratio is limited along with the limitation to the changing speed of the input torque to the belt type continuously variable transmission mechanism 4.

That is, upon the termination of the BSC continuation and shift to the control to return to the normal control, the flow from step S541→step S542→step S543→step S544 to step S545 in the flowchart in FIG. 11 is repeated until completion of the transmission. That is, in step S541 a target inertia torque is calculated from the engine torque. In step S542, a target primary rotation change rate is calculated from the target inertia torque and a reduction value of the target inertia torque is set. In step S543, a limited target primary rotary rate not exceeding a change rate (gradient) of an unlimited target primary rotary rate is calculated from the limited target inertia torque. In step S544, the transmission is controlled on the basis of the limited target primary rotary rate. Thus, under the transmission control based on the limited target primary rotary rate, the final limited target gear ratio characteristic shows a more gradual gradient than the final unlimited target gear ratio characteristic.

The returning control operation based on the torque delay and torque limits to the primary rotation increase rate used in the first embodiment is described with reference to a time chart in FIG. 14.

The engine torque characteristic is described first. From completion of the BSC to return to the normal control, the engine torque characteristic by the driver request torque rises stepwise. In the normal control without the torque limit control, the engine torque characteristic by the actual torque response rises immediately after the completion of the BSC. Meanwhile, the engine torque characteristic according to the first embodiment is maintained for some time after the completion of the BSC and rises with a delay as shown in the actual torque response after a decrease in the torque by the BSC.

Next, the target gear ratio characteristic and inertia torque characteristic are described. From the completion of the BSC to return to the normal control, the final target characteristic of the target primary rotary rate is given by step characteristic at the completion of the BSC. In the normal control without the limit control of the primary rotation increase rate, the target primary rotary rate characteristic greatly rises immediately after the completion of the BSC while according to the first embodiment it rises more gradually than in the normal control. The inertia torque characteristic according to the first embodiment gradually decreases from the completion of the BSC to the return to the normal control while that in the normal control sharply decreases from the completion of the BSC.

Lastly, the drive shat torque characteristic and inertia torque characteristic are described. Without the torque delay and limit control of increase rate of primary rotary rate (in normal control), the drive shat torque characteristic shows a large peak of inertia torque but slightly decreases after start of the transmission and then increases, as indicated by the characteristic E in FIG. 14. With such a drive shat torque characteristic, the impact does not occur due to the transmission.

Figure 14:
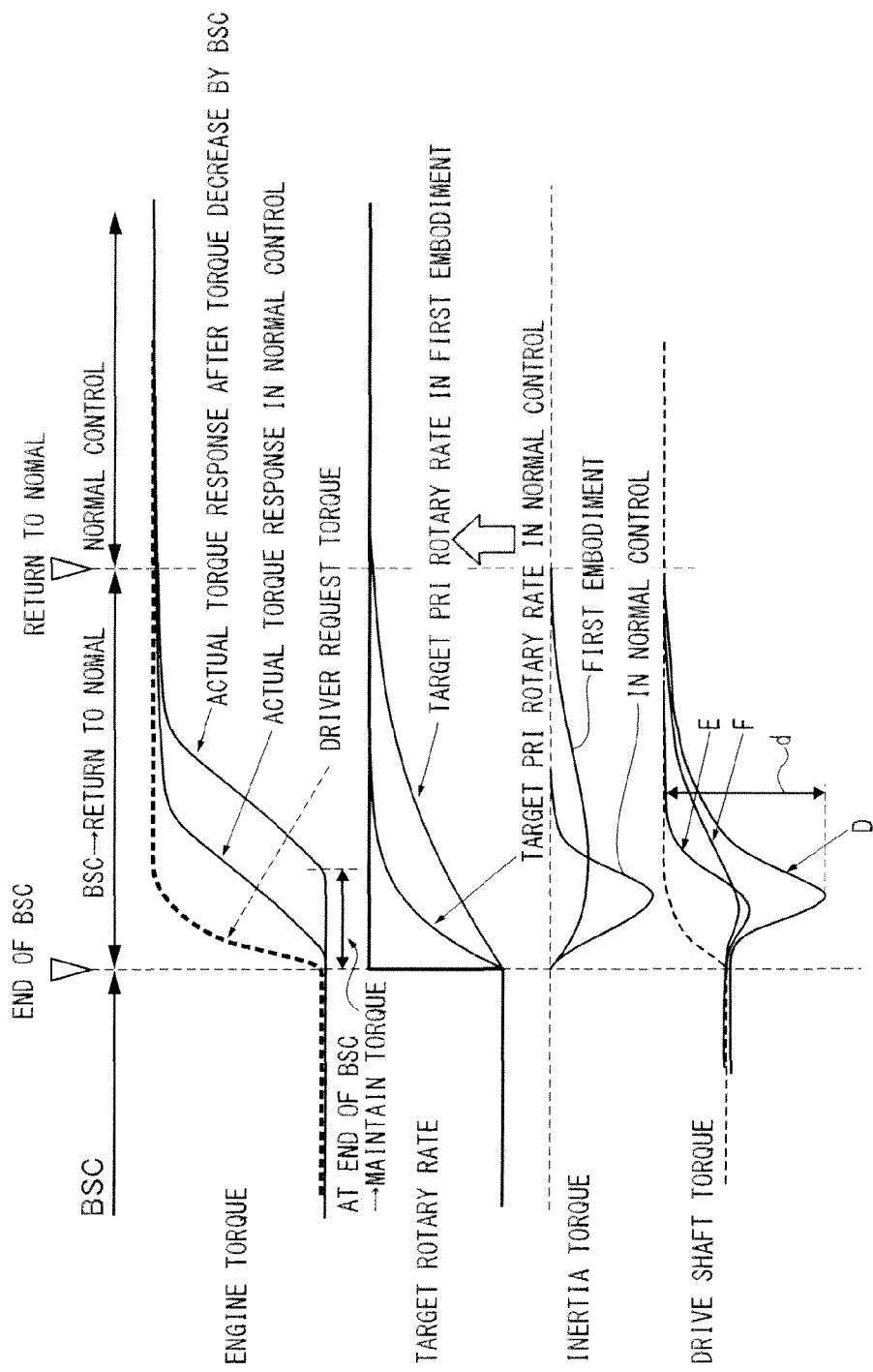
FIG. 14 is a timing chart of the characteristics of engine torque, target primary rotary rate, inertia torque, and drive shat torque by torque delay and torque limits to a primary rotation increase rate used in the returning control according to the first embodiment.

With the torque delay but without the limit control of the primary rotation increase rate, the drive shat torque characteristic maintains the inertia torque characteristic shown in the normal control as indicated by the characteristic D in FIG. 14 but the torque input to the engine delays due to the torque delay. Because of this, it drastically decreases after start of the transmission and then rise with a drop d. Such a change in the drive shat torque makes drivers feel the impact and deteriorates their drivability and comfort.

To the contrary, with the torque delay and the limit control of the primary rotation increase rate, the peak of the inertia torque can be reduced by the limit control over the primary rotation increase rate even with a delay in the engine torque input, so that the drive shat torque characteristic according to the first embodiment shows slightly decreases after start of the transmission and then increases, as indicated by the characteristic F in FIG. 14. Thus, it is seen that the impact can be suppressed by concurrently performing the torque delay and the limit control over the primary rotation increase rate.

As described above, in the returning control from belt slip control to the normal control, limiting the primary rotation change rate under the torque limit control makes it possible to reduce a change in the rotary inertia at the start of transmission and prevent a reduction in the drive shat torque from before the start of transmission. As a result, it is possible to prevent a driver from feeling unnecessary impact (deceleration).

Next, the effects of the control device and method for the belt type continuously variable transmission mechanism 4 according to the first embodiment are described in the following.

(1) The control device for the belt type continuously variable transmission 4, including the primary pulley 42 for receiving an input from a drive source (engine 1), the secondary pulley 43 for providing an output to the drive wheels 6, 6, and the belt 44 wrapped around the primary pulley 42 and the secondary pulley 43, and a secondary hydraulic pressure control means (secondary hydraulic pressure controller 92) configured to determine a command secondary hydraulic pressure by a feedback control based on a deviation θ between a target secondary hydraulic pressure and an actual secondary hydraulic pressure to control a secondary hydraulic pressure to the secondary pulley 43, the device further includes a belt slip control means (FIG. 8) configured to estimate a belt slip condition by monitoring a phase difference θ between an oscillation component included in the actual secondary hydraulic pressure and an oscillation component included in the actual gear ratio and to control the actual secondary hydraulic pressure to decrease on the basis of the estimation on that a predetermined belt slip condition is maintained. The secondary hydraulic pressure control means is configured to abort the feedback control over the secondary hydraulic pressure during the belt slip control and control the secondary hydraulic pressure by an open control. Thus, it is possible to provide the control device for the belt type continuously variable transmission 4 which can improve the stability of control over the secondary hydraulic pressure during belt slip control with the estimated accuracy of a belt slip condition ensured.

(2) The belt slip control means (FIG. 8) is configured to oscillate the secondary hydraulic pressure with appropriate frequency and amplitude during the belt slip control and estimate a belt slip condition by monitoring the phase difference between the oscillation component included in the actual secondary hydraulic pressure and the oscillation component included in the actual gear ratio. Therefore, the oscillation of the actual secondary hydraulic pressure does not affect the secondary hydraulic pressure control, which enables the acquirement of accurate phase differences θ in the oscillation component between the actual secondary hydraulic pressure and the actual gear ratio. By monitoring these phase differences θ, it is made possible to reliably determine the range immediately before the belt slip occurs.

(3) The secondary hydraulic pressure control means (secondary hydraulic pressure controller 92) is configured to set only the deviation to zero during the belt slip control and maintain a feedback control amount obtained immediately before a shift to the belt slip control to perform the open control over the secondary hydraulic pressure using the maintained feedback control amount which is constant. Thus, it is possible to prevent an occupant from feeling discomfort due to the drop in the secondary hydraulic pressure in returning from the open control to the feedback control.

(4) A control method for a belt type continuously variable transmission 4 by a belt slip control in which a belt slip condition among the primary pulley 42, secondary pulley 43, and belt 44 is controlled with a hydraulic pressure, the method comprises the steps of in the belt slip control, oscillating the hydraulic pressure to control the hydraulic pressure on the basis of an integrated value of an oscillation component included in an actual hydraulic pressure and an oscillation component included in an actual gear ratio, and aborting a feedback control over the hydraulic pressure during the belt slip control and controlling the hydraulic pressure by an open control. Thus, it is able to provide the control method for the belt type continuously variable transmission mechanism 4 which improve the stability of control over the secondary hydraulic pressure during the belt slip control with the estimated accuracy of a belt slip condition ensured.

(5) In the belt slip control, the belt slip condition is estimated by monitoring a phase difference calculated from the integrated value, to control the hydraulic pressure on the basis of the estimation so that a predetermined belt slip condition is maintained. Thus, it is possible to stably maintain a predetermined belt slip condition during the belt slip control by accurately acquiring a change in the belt slip condition by monitoring the phase difference correlated with the belt slip condition. As a result, under the belt slip control by which the belt friction is stably reduced, it is possible to realize target energy saving effects (practical fuel efficiency).

Although the control device and method for the belt type continuously variable transmission according to the present invention have been described in terms of the exemplary first embodiment, they are not limited thereto. It should be appreciated that design variations or additions may be made without departing from the scope of the present invention as defined by the following claims.

The first embodiment has described an example where a hydraulic pressure circuit of a single side adjusting type controlled by a step motor is used for the transmission hydraulic pressure control unit 7. However, another single side adjusting type or both sides adjusting, type transmission hydraulic pressure control unit can be also used.

The first embodiment has described an example where only the secondary hydraulic pressure is oscillated. However, for example, the primary hydraulic pressure together with the secondary hydraulic pressure can be concurrently oscillated at the same phase by a direct acting control system. Alternatively, the primary hydraulic pressure together with the secondary hydraulic pressure can be oscillated at the same phase by oscillating the line pressure.

The first embodiment has described an example of an oscillation means where the command secondary hydraulic pressure is given proper oscillation components. Alternatively, solenoid current values can be given proper oscillation components.

The first embodiment has described an example of the torque limit control during the returning control where the input torque at completion of the belt slip control is maintained only for a predetermined length of time. However, the torque limit control can be configured to allow a slight increase in the torque, for example.

The first embodiment has described an example of the limit control over the change speed of the gear ratio in the returning control where the change rate of the target primary rotary rate is limited. However, the limit control over the change speed of the gear ratio can be configured to limit time constant at transmission or to maintain the gear ratio at completion of the belt slip control for a predetermined length of time. Alternatively, the two of them can be combined.

The first embodiment has described an application example of an engine vehicle incorporating a belt type continuously variable transmission. The present invention is also applicable to a hybrid vehicle incorporating a belt type continuously variable transmission, an electric vehicle incorporating a belt type continuously variable transmission and the like. In short it is applicable to any vehicle incorporating a belt type continuously variable transmission which performs a hydraulic pressure transmission control.

Reference Signs List
1 engine
2 torque converter
3 forward/backward drive switch mechanism
4 belt type continuously variable transmission mechanism
40 transmission input shall
41 transmission output shaft
42 primary pulley
43 secondary pulley
44 belt
45 primary hydraulic pressure chamber
46 secondary hydraulic pressure chamber
5 final reduction mechanism
6,6 drive wheel
7 transmission hydraulic pressure control unit
70 oil pump
71 regulator valve
72 line pressure solenoid
73 transmission control valve
74 decompression valve
75 secondary hydraulic pressure solenoid
76 servo ink
77 transmission command valve
78 step motor
8 CVT control unit
80 primary rotation sensor
81 secondary rotation sensor
82 secondary hydraulic pressure sensor
83 oil temperature sensor
84 inhibitor switch
85 brake switch
86 accelerator opening sensor
87 other sensors and switches
88 engine control unit
90 basic hydraulic pressure calculator
91 line pressure controller
92 secondary hydraulic pressure controller (secondary hydraulic pressure control means)
93 sine wave oscillation controller
94 secondary hydraulic pressure corrector

The invention claimed is:

1. A control device for a belt type continuously variable transmission, comprising a primary pulley for receiving an input from a drive source, a secondary pulley for providing an output to a drive wheel, and a belt wrapped around the primary pulley and the secondary pulley to control a belt clamp force on the basis of a command secondary hydraulic pressure to the secondary pulley, the device further comprising:
   a switch means configured to determine, on the basis of a belt slip control permitting condition, whether or not to permit a belt slip control in which the secondary hydraulic pressure is reduced from that in a normal control and to switch between the belt slip control and the normal control; and
   a control means configured to
   in the normal control, set the command secondary hydraulic pressure by a feedback control based on a deviation between a target secondary hydraulic pressure and an actual secondary hydraulic pressure to control the secondary hydraulic pressure to the secondary pulley, and
   in the belt slip control, inhibit the feedback control based on the deviation, and, in replace of the feedback control, control the secondary hydraulic pressure to the secondary pulley by oscillating the secondary hydraulic pressure and monitoring a phase difference between an oscillation component included in an actual hydraulic pressure and an oscillation component included in an actual gear ratio to estimate a belt slip condition, and setting the command secondary hydraulic pressure on the basis of an estimation of the belt slip condition so that a predetermined belt slip condition is maintained.

2. A control method for a belt type continuously variable transmission in which a belt clamp force between a primary pulley, a secondary pulley, and a belt is controlled with a hydraulic pressure, the method comprising the steps of:

determining, on the basis of a belt slip control permitting condition, whether or not to permit a belt slip control in which a hydraulic pressure is reduced from that in a normal control and switching between the belt slip control and the normal control;

in the normal control, setting a command hydraulic pressure by a feedback control based on a deviation between a target hydraulic pressure and an actual hydraulic pressure to control the belt clamp force;

in the belt slip control, inhibiting the feedback control based on the deviation, and, in replace of the feedback control, oscillating the hydraulic pressure and setting a command hydraulic pressure on the basis of a multiplied value of an oscillation component included in an actual hydraulic pressure and an oscillation component included in an actual gear ratio to control the belt clamp force.

3. A control method for a belt type continuously variable transmission in which a belt clamp force between a primary pulley, a secondary pulley, and a belt is controlled with a hydraulic pressure, the method comprising the steps of:

determining, on the basis of a belt slip control permitting condition, whether or not to permit a belt slip control in which a hydraulic pressure is reduced from that in a normal control and switching between the belt slip control and the normal control;

in the normal control, setting a command hydraulic pressure by a feedback control based on a deviation between a target hydraulic pressure and an actual hydraulic pressure to control the belt clamp force;

in the belt slip control, inhibiting the feedback control based on the deviation, and, in replace of the feedback control, oscillating the hydraulic pressure and setting a command hydraulic pressure on the basis of a phase difference between an oscillation component included in an actual hydraulic pressure and an oscillation component included in an actual gear ratio to control the belt clamp force.

* * * * *